United States Patent
Wang et al.

(10) Patent No.: US 8,625,621 B2
(45) Date of Patent: Jan. 7, 2014

(54) METHOD TO SUPPORT FLEXIBLE DATA TRANSPORT ON SERIAL PROTOCOLS

(75) Inventors: Chi-Lie Wang, Milpitas, CA (US); Jason Z. Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 575 days.

(21) Appl. No.: 12/043,918

(22) Filed: Mar. 6, 2008

(65) Prior Publication Data

US 2009/0225769 A1 Sep. 10, 2009

(51) Int. Cl.
*H04L 12/28* (2006.01)
*H04J 3/16* (2006.01)
*H04J 3/24* (2006.01)
*G06F 3/00* (2006.01)
*G06F 5/00* (2006.01)

(52) U.S. Cl.
USPC ............. 370/412; 370/466; 370/474; 710/53; 710/57

(58) Field of Classification Search
USPC ............ 370/412; 364/200, 900; 395/427, 250
See application file for complete search history.

(56) References Cited

U.S. PATENT DOCUMENTS

| | | | |
|---|---|---|---|
| 4,214,305 A * | 7/1980 | Tokita et al. ................... | 710/113 |
| 4,335,277 A | 6/1982 | Puri | |
| 4,782,485 A | 11/1988 | Gollub | |
| 4,866,704 A | 9/1989 | Bergman | |
| 5,018,136 A | 5/1991 | Gollub | |
| 5,107,489 A * | 4/1992 | Brown et al. ................. | 370/360 |
| 5,245,704 A | 9/1993 | Weber et al. | |
| 5,257,384 A | 10/1993 | Farrand et al. | |
| 5,313,454 A | 5/1994 | Bustini et al. | |
| 5,426,643 A | 6/1995 | Smolinske et al. | |
| 5,530,902 A | 6/1996 | McRoberts et al. | |
| 5,572,697 A * | 11/1996 | Chevalier et al. ............. | 711/100 |
| 5,655,140 A | 8/1997 | Haddock | |
| 5,717,883 A | 2/1998 | Sager | |
| 5,777,547 A | 7/1998 | Waldrop | |
| 5,916,309 A | 6/1999 | Brown et al. | |
| 5,924,112 A | 7/1999 | Barber et al. | |
| 5,951,706 A | 9/1999 | Benner | |

(Continued)

OTHER PUBLICATIONS

Mercury Computer Systems, Inc. article entitled: "Serial Rapid IO-to-PCIe Bridge IP Core Available for Both ASICs and FPGAs . . ." dated Oct. 30, 2006; 2 pages.

(Continued)

*Primary Examiner* — Faruk Hamza
*Assistant Examiner* — Cassandra Decker
(74) *Attorney, Agent, or Firm* — Bever Hoffman & Harms LLP (57) ABSTRACT

A serial buffer transports packets through queues capable of operating in a packet mode or a raw data mode. In packet mode, entire packets are stored in a queue. In raw data mode, packet header/delimiter information is not stored in the queue (only packet data is stored). Packets can be transferred out of a queue in response to a slave read request. The serial buffer constructs a packet header in response to the slave read request, and retrieves a specified amount of packet data from the selected queue. The serial buffer also transfers out packets as a bus master when a water level exceeds a water mark within a queue. The serial buffer constructs packet headers for these bus master transfers, which may be performed in a flush mode or a non-flush mode (in packet mode), or in a flush mode (in raw data mode).

17 Claims, 4 Drawing Sheets

(56) References Cited

U.S. PATENT DOCUMENTS

| | | | |
|---|---|---|---|
| 5,983,301 A | 11/1999 | Baker et al. | |
| 6,046,817 A | 4/2000 | Brown et al. | |
| 6,047,319 A * | 4/2000 | Olson | 709/223 |
| 6,061,089 A | 5/2000 | Tonkin et al. | |
| 6,084,631 A | 7/2000 | Tonkin et al. | |
| 6,157,621 A | 12/2000 | Brown et al. | |
| 6,233,629 B1 * | 5/2001 | Castellano | 710/29 |
| 6,271,866 B1 | 8/2001 | Hancock et al. | |
| 6,333,938 B1 | 12/2001 | Baker | |
| 6,347,344 B1 * | 2/2002 | Baker et al. | 710/20 |
| 6,425,021 B1 * | 7/2002 | Ghodrat et al. | 710/22 |
| 6,442,687 B1 | 8/2002 | Savage | |
| 6,510,138 B1 | 1/2003 | Pannell | |
| 6,546,496 B1 | 4/2003 | Wang et al. | |
| 6,564,271 B2 | 5/2003 | Micalizzi, Jr. et al. | |
| 6,581,175 B1 | 6/2003 | Crump et al. | |
| 6,631,429 B2 | 10/2003 | Cota-Robles et al. | |
| 6,636,483 B1 | 10/2003 | Pannell | |
| 6,658,477 B1 | 12/2003 | Lisitsa et al. | |
| 6,748,020 B1 | 6/2004 | Eifrig et al. | |
| 6,862,298 B1 | 3/2005 | Smith et al. | |
| 6,907,479 B2 * | 6/2005 | Karnstedt et al. | 710/52 |
| 6,944,186 B2 | 9/2005 | Zaun et al. | |
| 6,985,969 B1 | 1/2006 | Cheng | |
| 6,993,602 B2 * | 1/2006 | Merrill et al. | 710/54 |
| 7,013,354 B1 * | 3/2006 | Beck et al. | 710/105 |
| 7,088,735 B1 | 8/2006 | Reohr, Jr. et al. | |
| 7,212,962 B2 | 5/2007 | Masushige et al. | |
| 7,213,094 B2 * | 5/2007 | Edirisoori | 710/310 |
| 7,436,858 B2 | 10/2008 | Goren et al. | |
| 7,594,002 B1 * | 9/2009 | Thorpe et al. | 709/219 |
| 7,617,346 B2 | 11/2009 | Wang et al. | |
| 7,631,128 B1 | 12/2009 | Sgrosso et al. | |
| 7,680,944 B1 | 3/2010 | Taghizadeh et al. | |
| 7,707,335 B2 | 4/2010 | Lidji et al. | |
| 7,710,969 B2 | 5/2010 | Szczepanek et al. | |
| 7,764,608 B2 | 7/2010 | Breynaert et al. | |
| 2001/0054116 A1 | 12/2001 | Cheng | |
| 2002/0080791 A1 * | 6/2002 | Sylvain | 370/394 |
| 2002/0171741 A1 | 11/2002 | Tonkin et al. | |
| 2002/0181481 A1 | 12/2002 | Iny | |
| 2004/0103333 A1 | 5/2004 | Martwick et al. | |
| 2004/0225779 A1 | 11/2004 | Zhao et al. | |
| 2004/0240478 A1 | 12/2004 | Goren et al. | |
| 2005/0100049 A1 | 5/2005 | Siminoff | |
| 2005/0100114 A1 | 5/2005 | Satagopan et al. | |
| 2005/0105556 A1 | 5/2005 | Joung et al. | |
| 2005/0135390 A1 | 6/2005 | Anderson et al. | |
| 2005/0144341 A1 | 6/2005 | Schmidt et al. | |
| 2005/0246424 A1 | 11/2005 | Panec et al. | |
| 2005/0254518 A1 | 11/2005 | Fujimori | |
| 2005/0283598 A1 | 12/2005 | Gaskins et al. | |
| 2006/0018329 A1 | 1/2006 | Nielsen et al. | |
| 2006/0056435 A1 * | 3/2006 | Biran et al. | 370/412 |
| 2006/0153238 A1 | 7/2006 | Bar-On et al. | |
| 2006/0224812 A1 | 10/2006 | Kapoor et al. | |
| 2006/0251088 A1 | 11/2006 | Thubert et al. | |
| 2007/0050564 A1 | 3/2007 | Gunna et al. | |
| 2007/0110046 A1 | 5/2007 | Farrell et al. | |
| 2007/0130410 A1 | 6/2007 | Keller et al. | |
| 2007/0230403 A1 | 10/2007 | Douglas et al. | |
| 2008/0008211 A1 | 1/2008 | Zilbershtein et al. | |
| 2008/0082840 A1 | 4/2008 | Kendall et al. | |
| 2008/0096433 A1 | 4/2008 | Bixler | |
| 2008/0205422 A1 | 8/2008 | Wang et al. | |
| 2008/0205438 A1 | 8/2008 | Juan et al. | |
| 2008/0209084 A1 | 8/2008 | Wang et al. | |
| 2008/0209089 A1 | 8/2008 | Mo et al. | |
| 2008/0301327 A1 | 12/2008 | Archer et al. | |
| 2009/0052323 A1 | 2/2009 | Breynaert et al. | |
| 2009/0086751 A1 | 4/2009 | Wang et al. | |
| 2009/0181663 A1 | 7/2009 | Hu et al. | |
| 2009/0225770 A1 | 9/2009 | Wang et al. | |
| 2009/0292935 A1 | 11/2009 | Hallnor et al. | |
| 2010/0111526 A1 | 5/2010 | Bader | |

OTHER PUBLICATIONS

RapidIO Interconnect Specification, Part VI: Physical Layer 1x/4x LP Serial Specification, Rev. 1.2, Jun. 2002.

* cited by examiner

METHOD TO SUPPORT FLEXIBLE DATA TRANSPORT ON SERIAL PROTOCOLS

RELATED APPLICATIONS

The present application is related to, and incorporates by reference, the following commonly owned, co-filed U.S. patent applications Ser. No. 12/043,929 filed by Chi-Lie Wang and Jason Z. Mo on Mar. 6, 2008, entitled "Protocol Translation In A Serial Buffer"; Ser. No. 12/043,934 also filed by Chi-Lie Wang and Jason Z. Mo on Mar. 6, 2008, entitled "Serial Buffer To Support Reliable Connection Between Rapid I/O End-Point And FPGA Lite-Weight Protocols"; Ser. No. 12/043,940 filed by Chi-Lie Wang on Mar. 6, 2008, entitled "Power Management On sRIO Endpoint"; Ser. No. 12/043,943 filed by Chi-Lie Wang and Jason Z. Mo on Mar. 6, 2008, entitled "Serial Buffer To Support Rapid I/O Logic Layer Out Of Order Response With Data Retransmission"; and Ser. No. 12/043,944 filed by Chi-Lie Wang, Jason Z. Mo, Calvin Nguyen and Bertan Tezcan on Mar. 6, 2008, entitled "Method To Support Lossless Real Time Data Sampling And Processing On Rapid I/O End-Point".

FIELD OF THE INVENTION

The present invention relates to improved methods for performing data transfers through a serial buffer.

RELATED ART

A conventional serial buffer typically provides data offload functions. That is, packets received by the serial buffer are temporarily stored within a memory of the serial buffer, before these packets are subsequently transferred out of the serial buffer. Each packet typically includes a packet header and associated packet data. Thus, storing a packet in the serial buffer includes writing both the packet header and the associated packet data of a received packet into the memory of the serial buffer. Similarly, transferring a packet out of the serial buffer includes reading both the packet header and the associated packet data of the packet from the memory of the serial buffer, and then transferring this packet header and packet data out of the serial buffer.

A conventional serial buffer may include multiple ports, which are capable of implementing different serial protocols (such as a serial rapid I/O (sRIO) protocol and a Lite-weight protocol). The various ports of a serial buffer may also be configured to interface with different applications (or processors). In view of the different requirements that may be presented by different serial protocols and different applications, it would be desirable to have improved methods for efficiently and flexibly transporting packets through a serial buffer.

SUMMARY

Accordingly, the present invention provides a method for operating a serial buffer having a first port and a second port, wherein the first port can be configured either with an SRIO protocol (as an SRIO endpoint) or with a Lite-weight protocol (as implemented by an FPGA), and wherein the second port can be configured with the Lite-weight protocol. In order to perform data transfers through different serial protocols, the present invention provides flexibility for data transport with the following features.

In accordance with one embodiment, the serial buffer includes one or more queues, each of which can be configured to operate in either a packet mode or a raw data mode. If a queue is configured to operate in the packet mode, and an incoming packet is designated to be stored in the queue, then both the packet header and the associated packet data of the incoming packet are stored in the queue. However, if a queue is configured to operate in the raw data mode, and an incoming packet is designated to be stored in the queue, then the packet header of the incoming packet is not stored in the queue. Rather, only the packet data of the incoming packet is stored in the queue. By not storing the packet header in queues configured to operate in the raw data mode, efficient memory usage may be realized in certain applications. For example, the raw data mode is useful to store packet data received from devices that implement non-intelligent serial protocols.

Packet data can be transferred out of a queue in response to a slave read request received on a port of the serial buffer. The slave read request specifies a destination ID (i.e., the identity of the queue to be read), a source ID (i.e., the identity of the device issuing the slave read request), and the size of the data transfer (e.g., the number of packets, if the queue is configured in packet mode, or the number of double-words, if the queue is configured in raw data mode). In response to a slave read request, the serial buffer constructs a packet header, and retrieves the specified amount of packet data from the specified queue. The packet header is constructed in response to the original slave read request, such that the destination ID of the slave read request becomes the source ID of the constructed packet header, and the source ID of the slave read request becomes the destination ID of the constructed packet header. The serial buffer then transmits the constructed packet header and retrieved packet data to the device specified by the destination ID of the constructed packet header. Note that a single slave read request can retrieve one packet or multiple packets from a queue configured in the packet mode. Similarly, a single slave read request can retrieve any number of double words from a queue configured in the raw data mode. Thus, slave read requests allow the data read from a specified queue to have different sizes than the data written to the specified queue. Moreover, different slave read requests can specify different destinations for data transfers from the same queue. Different slave read requests can also specify the same destination for data transfers from different queues. In this manner, the slave read requests provide improved flexibility for transferring packet data through the serial buffer.

The serial buffer can also transfer packet data out of a queue as a bus master when a water level of the queue exceeds a water mark of the queue. If the queue to be read during a bus master read operation is configured to operate in the packet mode, then a previously written packet header is read from the queue, and is used to construct a new packet header. The serial buffer also performs a look-up operation to retrieve additional information that is used to construct the new packet header, wherein this look-up operation is specified by the identity of the queue being read. This look-up operation may also specify whether the queue being read is configured in a flush mode (wherein all packets below the water level in the selected queue are read during the bus master read operation) or a non-flush mode (wherein one packet below the water level in the selected queue is read during the bus master read operation). The specified packet data is then read from the selected queue. The serial buffer then transmits the constructed packet header and retrieved packet data to a destination specified by the selected queue.

If the queue to be read during a bus master read operation is configured to operate in the raw data mode, then no packet header was previously written to the selected queue. In this case, the serial buffer performs a look-up operation to retrieve information to construct a packet header, wherein this look-up operation is specified by the identity of the queue being read. Each queue configured to operate in the raw data mode is also configured to operate in the flush mode, such that all data values below the water level are read from the selected queue during a bus master read operation. The serial buffer transmits the constructed packet header and retrieved data to a destination specified by the selected queue.

In accordance with one embodiment, the water mark of each queue can be independently selected, thereby providing flexibility in selecting the amount of data to be read from each queue during a bus master read operation. Thus, data read out from a queue during a bus master read operation may have a different size than data written to the queue during a previous write operation.

The present invention will be more fully understood in view of the following description and drawings.

DETAILED DESCRIPTION

Figure 1:
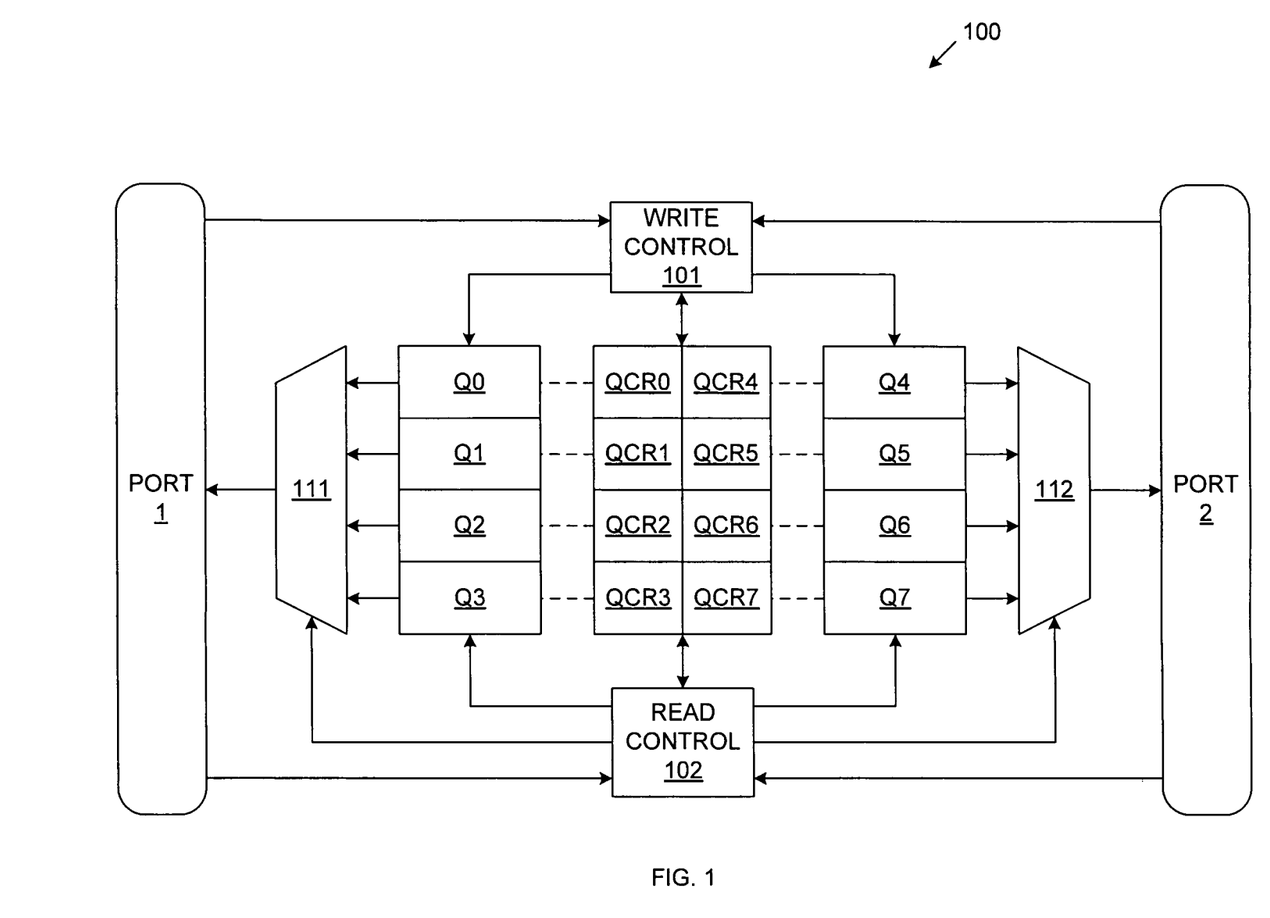
FIG. 1 is a block diagram of a serial buffer that implements write control logic and read control logic in accordance with one embodiment of the present invention.

FIG. 1 is a block diagram of a serial buffer 100 in accordance with one embodiment of the present invention. Serial buffer 100 includes first port 1, second port 2, queues Q0-Q7, queue configuration registers QCR0-QCR7, write control logic 101, read control logic 102 and multiplexers 111-112. In the described embodiments, the first port 1 of serial buffer 100 can be configured to operate in accordance with an sRIO protocol, and provide an interface to an sRIO endpoint (not shown). The second port 2 of serial buffer 100 can be configured to operate in accordance with either the sRIO protocol or a Lite-weight protocol. When configured to operate in accordance with a Lite-weight protocol, the second port 2 provides an interface to a Lite-weight protocol device, such as a field programmable device (not shown). In order to facilitate data transfers through different serial protocols (e.g., between sRIO and Lite-weight protocols), serial buffer 100 provides the following features.

Write control logic 101 controls write operations to queues Q0-Q7. Each of queues Q0-Q7 can be written from either the first port 1 or the second port 2. However, for a given configuration, each of queues Q0-Q7 is configured to connect to either the first port 1 or the second port 2.

In the described embodiments, each of the queues Q0-Q7 has a corresponding queue configuration register QCR0-QCR7, respectively. Each of the queue configuration registers QCR0-QCR7 stores information that specifies the operation of the corresponding queue. For example, each of the queue configuration registers QCR0-QCR7 stores a source identifier (ID) value, which specifies an 'address' of the corresponding queue for access purposes. Each of the queue configuration registers QCR0-QCR7 also stores a destination ID value, which specifies an 'address' where data stored in the corresponding queue will be transmitted. In accordance with one embodiment, each of the queue configuration registers QCR0-QCR7 also stores an access mode ID, which indicates whether the corresponding queue is configured to operate in a packet mode or a raw data mode.

If a queue is configured to operate in the packet mode, then this queue will store packet header/delimiter information and associated packet data. However, if a queue is configured to operate in the raw data mode, then this queue will store packet data, but not the associated packet header information. In various embodiments, the associated packet delimiter information (i.e., start-of-packet and end-of-packet information) may or may not be stored with the packet data. Thus, queues configured to operate in the raw data mode may provide efficient memory usage, because it is not necessary to store the packet header/delimiter information in these queues. Queues configured to operate in the raw data mode may be used, for example, to store packet data received from devices using non-intelligent serial protocols, which do not include higher layer packet headers.

Each of queues Q0-Q3 can be read in response to slave read request packets received from the first port 1. Similarly, each of queues Q4-Q7 can be read in response to slave read requests received from the second port 2.

A slave read request packet specifies the queue to be read, the amount of data to be read from the queue, and the destination of the data read from the queue. The size of data read from the queue in response to a slave read request may be different than the size of data previously written to the queue. Read control logic 102 constructs an outgoing packet header in response to the original slave read request packet, such that packet header information does not need to be retrieved from the queue during a slave read request.

Read control logic 102 may operate as a bus master to transfer data from one of queues Q0-Q7 when the water level exceeds a watermark within one of these queues Q0-Q7. Note that queues Q0-Q7 are each assigned a priority within serial buffer 100, with higher priority queues being processed first. In one embodiment, each of the queue configuration registers QCR0-QCR7 stores a priority value, which identifies the priority of the corresponding queue.

When operating as a bus master, read control logic 102 is configured to construct a packet header to be appended to the packet data read from the selected queue. This packet header is constructed in response to the identity of the queue being read. If the queue being read is configured in the packet mode, then this packet header is also constructed in response to packet header information read from the queue.

Moreover, when operating as a bus master, read control logic 102 can be configured to read packet data from the selected queue in a flush mode or a non-flush mode. In the flush mode, read control logic 102 will cause all data below the water mark to be transferred out of the selected queue in a single operation. In the non-flush mode, read control logic 102 will cause the data associated with a single packet to be transferred out of the selected queue. In one embodiment, each of the queue configuration registers QCR0-QCR7 stores a read mode ID value, which indicates whether the corresponding queue is configured to be read in the flush mode or the non-flush mode.

The operation of serial buffer 100 will now be described in more detail.

Figure 2:
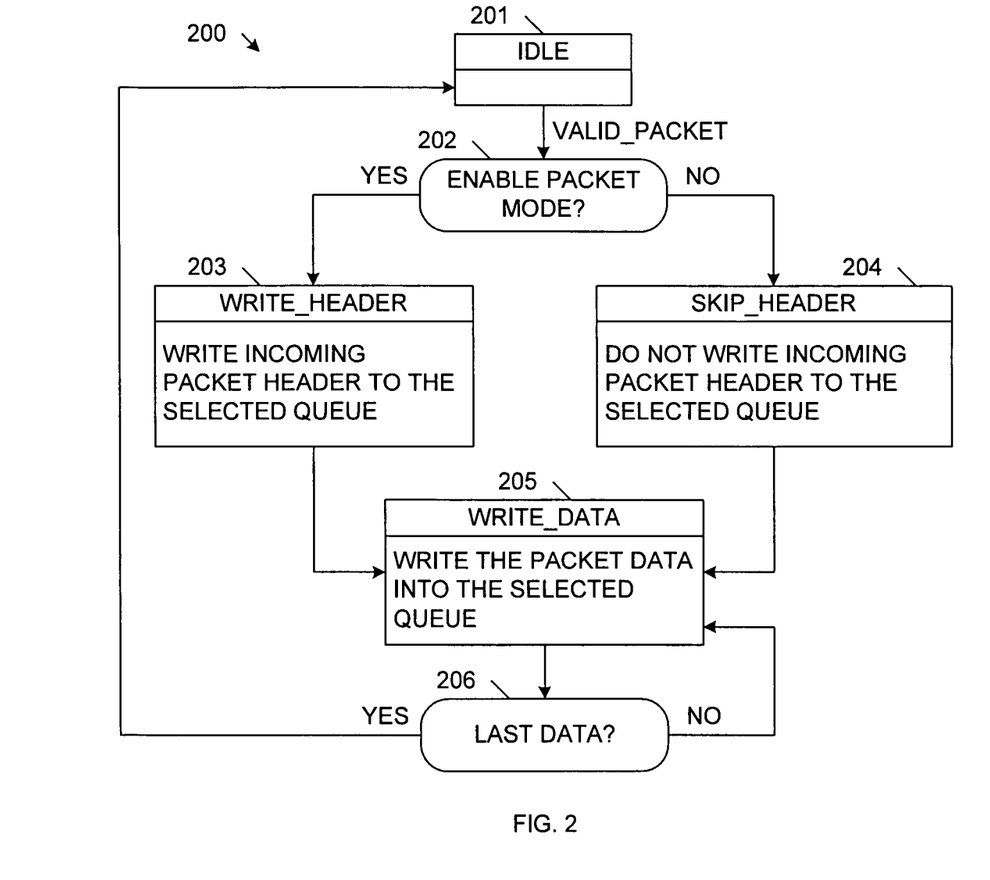
FIG. 2 is a flow diagram that defines the operation of the write control logic of the serial buffer of FIG. 1 in accordance with one embodiment of the present invention.

FIG. 2 is a flow diagram 200, which defines the operation of write control logic 101 in accordance with one embodiment of the present invention. Write control logic 101 receives incoming write request packets from first port 1 and second port 2. Each of these incoming packets includes a packet header and packet data. Each packet header includes a destination identifier (ID) that identifies the queue (or queues) to which the incoming packet should be written.

Write control logic 101 is initially in an IDLE state 201. While in the IDLE state 201, write control logic 101 monitors the incoming packets received from the first port 1 and the second port 2, to determine when a valid write request has been received. In one embodiment, write control logic 101 identifies a valid write request (VALID_PACKET=1) when the destination ID in the header of an incoming packet matches one of the destination ID values stored in queue configuration registers QCR0-QCR7. Multiple queue configuration registers can be programmed to store the same destination ID value, thereby enabling multicast support, wherein the incoming packet is simultaneously written into multiple corresponding queues. Each queue associated with a queue configuration register that stores a matching destination ID value is identified as a selected write queue. For example, if write control logic 101 determines that the destination ID of an incoming packet matches the destination ID values stored in queue configuration registers QCR0 and QCR4, then queues Q0 and Q4 are identified as selected write queues, and write control logic 101 will implement a write operation to these queues Q0 and Q4 in the manner described below. After identifying a valid write request (and the selected write queue(s)), processing proceeds to Step 202.

Within Step 202, write control logic 101 determines whether the incoming packet should be processed in accordance with a packet mode or a raw data mode. In the described embodiments, write control logic 101 accesses the queue configuration register(s) of the selected write queue(s) to determine whether the selected write queue(s) is/are configured to operate in the packet mode or the raw data mode. More specifically, write control logic 101 retrieves the access mode ID value(s) stored in the queue configuration register(s) of the selected write queue(s) to determine whether the selected write queue(s) is/are configured to operate in the packet mode or the raw data mode. In the multicast case, each of the selected write queues is configured in the same mode.

If write control logic 101 determines that the packet mode is enabled for the selected write queue(s) (Step 202, YES branch), then processing proceeds to WRITE_HEADER state 203. In this state 203, write control logic 101 causes the packet header of the incoming packet to be written to the selected write queue(s). Note that the header of the incoming packet will include a start-of-packet symbol (SOP). Processing then proceeds to WRITE_DATA state 205.

Within WRITE_DATA state 205, write control logic 101 causes the packet data of the incoming packet to be written into the selected write queue(s). Processing then proceeds to Step 206. If the data value (e.g., double-word) previously written to the selected write queue(s) during WRITE_DATA state 205 is not the last data value of the packet data (Step 206, NO branch), then processing returns to WRITE_DATA state 205, wherein the next data value of the packet data is written to the selected write queue(s). However, if the data value written to the selected write queue(s) represents the last data value of the packet data (Step 206, YES branch), then processing returns to the IDLE state 201. The last data value of the packet data can be specified, for example, by an end-of-packet symbol (EOP).

Returning now to Step 202, if write control logic 101 determines that the packet mode is not enabled for the selected write queue(s) (Step 202, NO branch), then processing proceeds to SKIP_HEADER state 204. In this case, the incoming packet is written to the selected write queue(s) in accordance with a raw data mode. Thus, in SKIP_HEADER state 204, write control logic 101 does not write the header of the incoming packet to the selected write queue(s). Rather, processing proceeds to WRITE_DATA state 205, wherein only the packet data of the incoming packet is written into the selected write queue(s). In one variation of the present invention, packet delimiter information (e.g., SOP/EOP symbols) is included in the packet data written into the selected write queue(s). This variation allows a non-intelligent field programmable gate array (FPGA) device to send in packets for temporary storage within serial buffer 100. As described in more detail below, these packets can be subsequently sent out of serial buffer 100, without requiring software to construct packet headers for these packets. After all of the packet data of the incoming packet has been written into the selected write queue(s), (Step 206, YES branch), processing returns to IDLE state 201.

Because the packet header is not written to the selected write queue in the raw data mode, efficient memory use within queues Q0-Q7 may be realized in certain applications.

Figure 3:
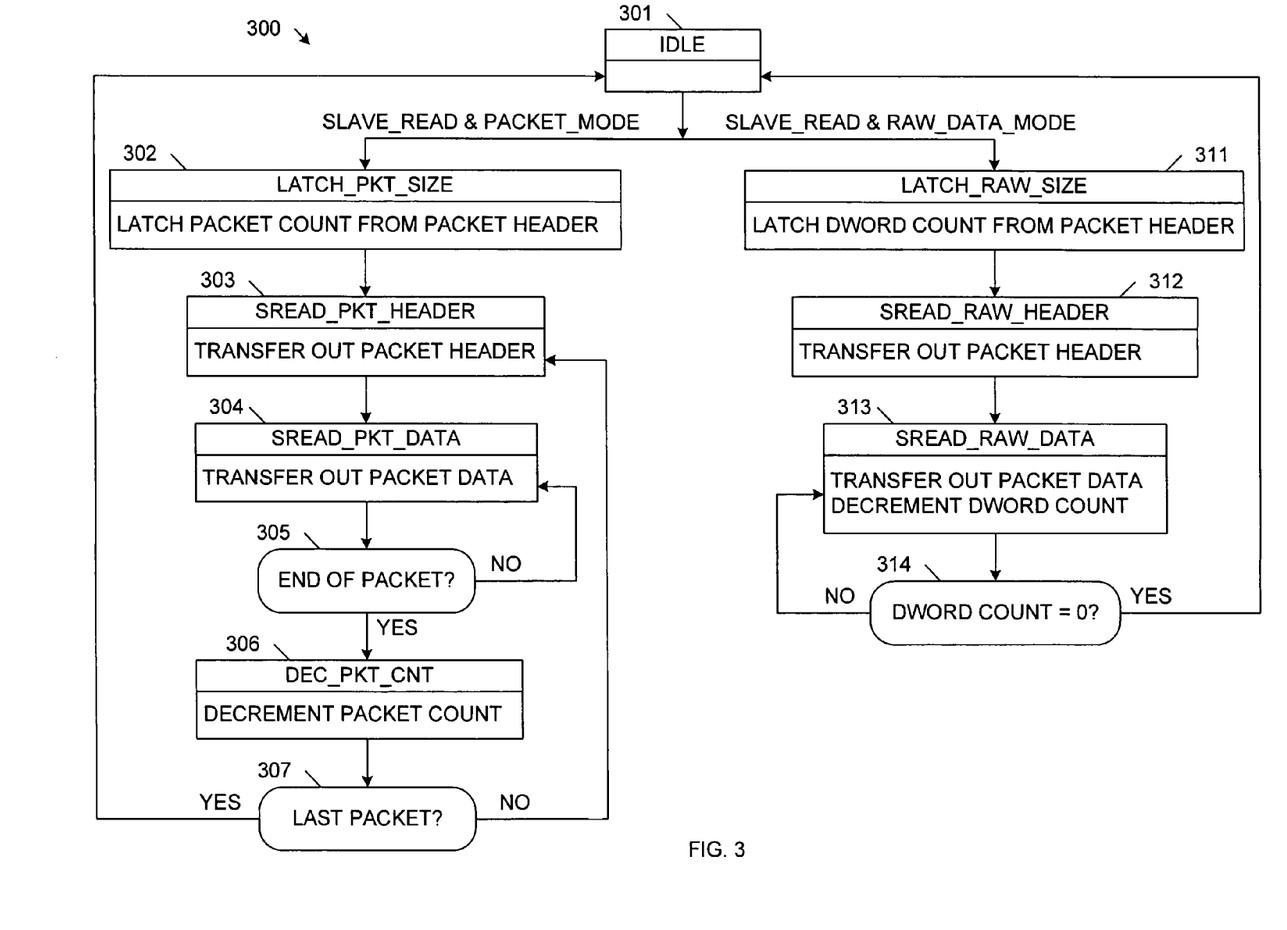
FIG. 3 is a flow diagram that defines the manner in which the read control logic of the serial buffer of FIG. 1 operates in response to slave read requests, in accordance with one embodiment of the present invention.

FIG. 3 is a flow diagram 300, illustrating the manner in which read control logic 102 operates in response to slave read requests, in accordance with one embodiment of the present invention. In general, slave read requests are specified by priority packets received from either the first port 1 or the second port 2. In accordance with the present invention, each slave read request packet includes a source identifier (ID) that identifies the device that has issued the slave read request, a destination ID that identifies the queue to be read within serial buffer 100, and a data size field that identifies the amount of data to be read from the selected queue.

Turning now to FIG. 3, read control logic 102 is initially in an IDLE state 301. While in the IDLE state 301, read control logic 102 monitors the incoming packets received from the first port 1 and the second port 2, to determine when a valid slave read request has been received. In one embodiment, read control logic 102 identifies a valid slave read request (SLAVE_READ=1) upon detecting the presence of a slave read request symbol in a received priority packet, and determining that a destination ID present in this received priority packet matches one of the source ID values stored in queue configuration registers QCR0-QCR7. Upon identifying a valid slave read request, read control logic 102 latches the associated source ID, destination ID and data size field from the corresponding priority packet.

The queue associated with a queue configuration register that stores a matching source ID value is identified as the selected slave read queue. For example, if read control logic 102 determines that the destination ID of an incoming slave read priority packet matches the destination ID value stored in queue configuration register QCR1, then queue Q1 is identified as the selected slave read queue, and read control logic 102 will implement a read operation to this queue Q1 in the manner described below. Note that multiple queues cannot share the same source ID value, as data contention would exist if multiple queues provided the requested data at the same time.

Also within Step 301, read control logic 102 determines whether the corresponding slave read operation should be performed in a packet mode or a raw data mode. In the described embodiments, read control logic 102 accesses the queue configuration register of the selected slave read queue to determine whether this queue is configured to operate in the packet mode or the raw data mode. More specifically, read control logic 102 retrieves the access mode ID value stored in the queue configuration register of the selected slave read queue to determine whether the selected slave read queue is configured to operate in the packet mode (PACKET_MODE=1) or the raw data mode (RAW_DATA MODE=1).

If read control logic 102 determines that the packet mode is enabled for the selected slave read queue, then processing proceeds to LATCH_PKT_SIZE state 302. In this state 302, read control logic 102 latches the data size field of the slave read request packet. When the selected slave read queue is configured to operate in the packet mode, the data size field specifies the number of packets to be read from the selected slave read queue during the associated slave read operation. Note that the sRIO protocol only allows one packet to be read in response to a slave read request, while the Lite-weight protocol allows multiple packets to be read in response to a slave read request. Processing then proceeds to SREAD_PKT_HEADER state 303.

Within SREAD_PKT_HEADER state 303, read control logic 102 constructs a packet header using the previously latched source ID and destination ID of the slave read request. In constructing this packet header, read control logic 102 switches the latched source ID and destination ID of the slave read request, such that the source ID of the slave read request becomes the destination ID of the constructed packet header, and the destination ID of the slave read request becomes the source ID of the constructed packet header. Read control logic 102 transfers this constructed packet header out of serial buffer 100, via the same port that originated the slave read request. Processing then proceeds to SREAD_PKT_DATA state 304.

Within SREAD_PKT_DATA state 304, read control logic 102 reads packet data from the selected slave read queue, and transfers this packet data out of serial buffer 100 via the same port that originated the slave read request. Because read control logic 102 has constructed a packet header in response to the original slave read request (SREAD_PKT_HEADER state 303), read control logic 102 does not need to read the corresponding packet header previously written to the selected slave read queue. Processing then proceeds to Step 305.

If the data value (e.g., double-word) previously read from the selected slave read queue during SREAD_PKT_DATA state 304 is not the last data value of the packet data (Step 305, NO branch), then processing returns to SREAD_PKT_DATA state 304, wherein the next data value of the packet data is read from the selected slave read queue. However, if the data value read from the selected slave read queue represents the last data value of the packet data (Step 305, YES branch), then processing then processing proceeds to DEC_PKT_CNT state 306. The last data value of the packet data can be specified, for example, by an end-of-packet symbol (EOP).

Within DEC_PKT_CNT state 306, the packet count latched during LATCH_PKT_SIZE state 302 is decremented by one, to reflect the fact that a packet has been read out of the selected slave read queue. Processing then proceeds to Step 307.

If the latched packet count has not yet reached a zero value (Step 307, NO branch), thereby indicating that not all of the packets specified by the slave read request have been read, then processing returns to SREAD_PKT_HEADER state 303, such that the next packet is read from the selected slave read queue in the manner described above.

However, when the latched packet count reaches zero (Step 307, YES branch), thereby indicating that all of the requested packets have been read out of the selected slave read queue, then processing returns to IDLE state 301.

Returning now to IDLE state 301, if read control logic 102 initially determines that the raw data mode is enabled for the selected slave read queue, then processing proceeds to LATCH_RAW_SIZE state 311. In this state 311, read control logic 102 latches the data size field of the packet header of the slave read request packet. When the selected slave read queue is configured to operate in the raw data mode, the data size field specifies the number of data values (e.g., double-words) to be read from the selected slave read queue during the associated slave read operation. Note that the specified number of data values to be read from selected slave read queue during in the raw data mode is independent of the number of data values written to the same queue during a write operation.

Processing proceeds from LATCH_RAW_SIZE state 311 to SREAD_RAW_HEADER state 312. Within SREAD_RAW_HEADER state 312, read control logic 102 constructs a packet header using the previously latched source ID and destination ID of the slave read request. In constructing this packet header, the source ID of the slave read request becomes the destination ID of the constructed packet header, and the destination ID of the slave read request becomes the source ID of the constructed packet header. Read control logic 102 transfers this constructed packet header out of serial buffer 100, via the same port that originated the slave read request. Processing then proceeds to SREAD_RAW_DATA state 313.

Within SREAD_RAW_DATA state 313, read control logic 102 reads a data value (e.g., double-word) from the selected slave read queue, and transfers this data value out of serial buffer 100 via the same port that originated the slave read request. Also within SREAD_RAW_DATA state 313, the double-word count latched during LATCH_RAW_SIZE state 311 is decremented by one, to reflect the fact that a double-word has been read out of the selected slave read queue. Processing then proceeds to Step 314.

If the latched double-word count has not yet reached a zero value, (Step 314, NO branch), then processing returns to SREAD_RAW_DATA state 313, wherein the next double-word is read from the selected slave read queue, and the latched double-word count is again decremented by one. However, if the latched double-word count has reached a zero value, (Step 314, YES branch), thereby indicating that all of the double-words specified by the slave read request have been read out of the selected slave read queue, the processing returns to IDLE state 301.

In the above-describe manner, data stored in the selected slave read queue can be read out in either a packet mode or a raw data mode, in response to a slave read request packet. When a selected slave read queue is configured to operate in the packet mode, the number of packets read out of the selected slave read queue during a slave read operation may be different than the number of packets written to the same queue during a single write operation. Similarly, when a selected slave read queue is configured to operate in the raw data mode, the number of data values read out of the selected slave read queue during a slave read operation may be different than the number of data values written to the same queue during a single write operation.

A single processor may read data from different queues within serial buffer 100 by issuing different slave read request packets. These slave read request packets may specify different slave read data sizes from the different queues. Moreover, different processors may transmit slave read request packets to serial buffer 100 to access the same queue. These different processors may specify different slave read data sizes.

These features advantageously increase the flexibility of transporting data through the serial buffer 100. For example, in a particular embodiment, real time sampling data from multiple radio cards can be merged and written to a selected queue. Multiple slave read requests can be used to transfer subsets of the merged data from the selected slave read queue to different processors (wherein the number of processors may be different than the number of radio cards).

Figure 4:
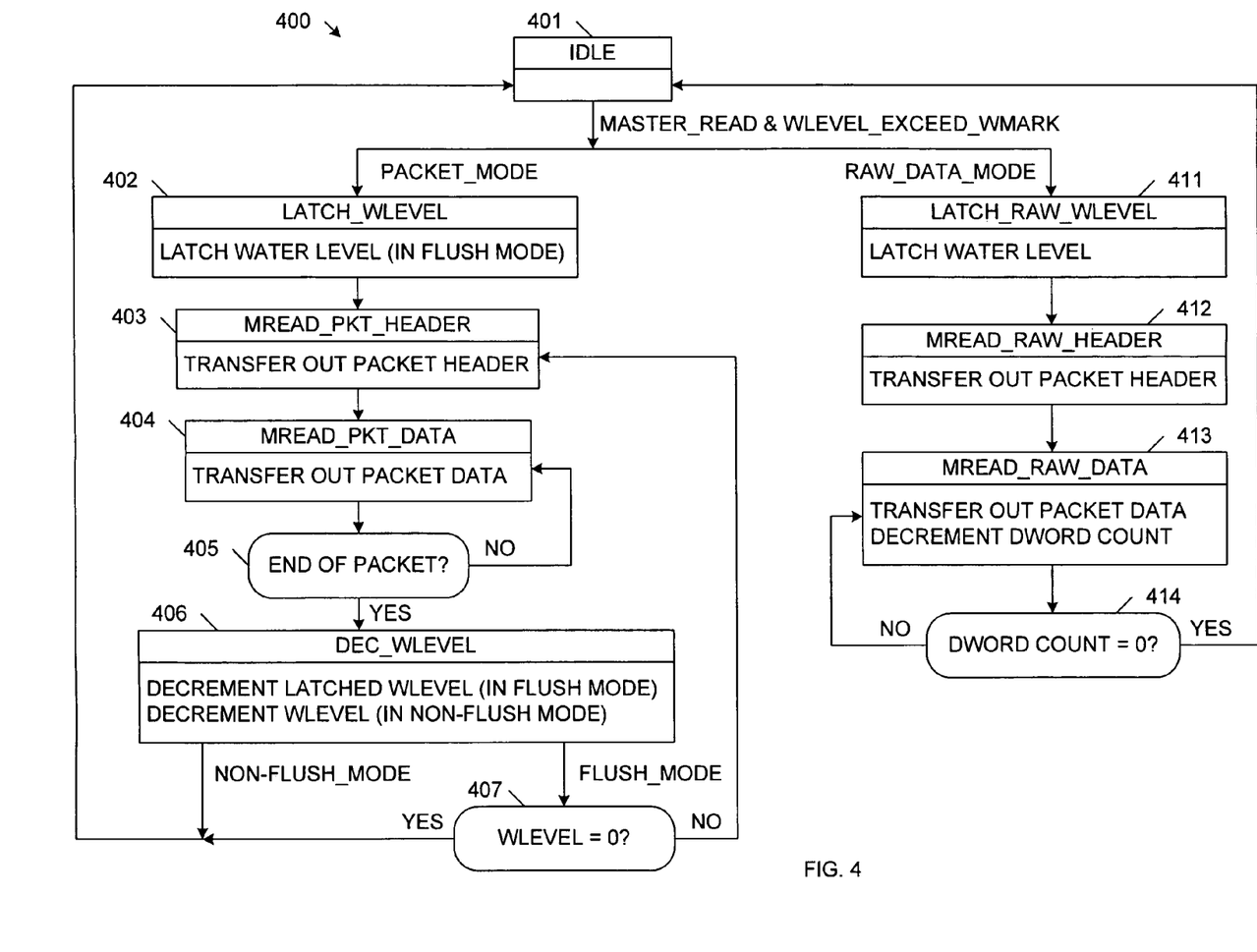
FIG. 4 is a flow diagram that defines the manner in which the read control logic of the serial buffer of FIG. 1 operates in response to master read requests, in accordance with one embodiment of the present invention.

FIG. 4 is a flow diagram 400 illustrating the manner in which read control logic 102 operates as a bus master to transfer data out of one of the queues Q0-Q7 when a water level associated with the queue exceeds a water mark associated with the queue. In one embodiment, the water mark associated with each queue is stored in the corresponding queue configuration register. In the event that multiple queues have water levels that exceed their water marks, read control logic 102 will process the highest priority queue first. The queue being read under these conditions is hereinafter referred to as the selected master read queue.

Turning now to FIG. 4, read control logic 102 is initially in an IDLE state 401. While in the IDLE state 401, read control logic 102 monitors the water levels of queues Q0-Q7, to determine when any of these water levels exceeds the corresponding water mark of the queue. If the water level exceeds the water mark within one or more of queues Q0-Q7 (WLEVEL_EXCEED_WMARK=1), and serial buffer 100 is enabled to perform master read operations (MASTER_READ=1), then read control logic 102 will identify the selected master read queue (by comparing the assigned priorities of the queues having a water level that exceeds its water mark). Read control logic 102 also accesses the queue configuration register associated with the selected master read queue to determine whether this queue should be read in packet mode or raw data mode. More specifically, read control logic 102 retrieves the access mode ID value stored in the queue configuration register of the selected master read queue to determine whether the selected master read queue is configured to operate in the packet mode or the raw data mode. If read control logic 102 determines that the selected master read queue is configured to be read in the packet mode, processing proceeds to LATCH_WLEVEL state 402.

Read control logic 102 also accesses the queue configuration register associated with the selected master read queue to determine whether this queue is configured to be read in the flush mode or the non-flush mode. More specifically, read control logic 102 retrieves the read mode ID value stored in the queue configuration register associated with the selected master read queue to determine whether the selected master read queue is configured to operate in the flush mode or the non-flush mode. In the flush mode, all data packets below the water mark of the selected master read queue will be read. Thus, the flush mode can be used to maximize bandwidth and performance of transfers out of serial buffer 100. In the non-flush mode, a single data packet will be read from the selected master read queue.

Within LATCH_WLEVEL state 402, read control logic 102 stores the water mark of the selected master read queue as a latched water level value if the flush mode is enabled for this queue. In this manner, the latched water level value is a fixed value (i.e., the water mark), thereby guaranteeing a fixed amount of data will be transferred to the target application. Note that if the non-flush mode is enabled, the water mark is not latched (because only a single packet will be read from the selected master read queue in the non-flush mode). Processing proceeds from LATCH_WLEVEL state 402 to MREAD_PKT_HEADER state 403.

Within MREAD_PKT_HEADER state 403, read control logic 102 performs a read access to the selected master read queue, thereby retrieving the packet header of the next packet to be read from this queue. In the described embodiment, queues Q0-Q7 are accessed in a first in, first out (FIFO) manner. This retrieved packet header is used to construct a corresponding outgoing packet header, which is transferred out of serial buffer 100, via a port (e.g., the first port 1 or the second port 2) associated with the selected master read queue. The constructed outgoing packet header will include, for example, the packet size field of the packet header retrieved from the selected master read queue. The constructed outgoing packet header will also include the source ID of the selected master read queue, which is retrieved from the corresponding queue configuration register. The constructed outgoing packet header will also include additional information, including an sRIO packet priority level (PRIO_n[1:0]), a TT value (TT_n), a frame type value (FTYPE_n[3:0]), a transaction type value (TTYPE_n[3:0]) and a destination identification (ID) value (DEST_ID_n[3:0]). A TT value of '0' indicates that a corresponding sRIO packet includes 8-bit source and destination ID values, and a TT value of '1' indicates that a corresponding sRIO packet includes 16-bit source and destination ID values. The frame type value and transaction type values are used to specify different sRIO packet types. In one embodiment, this additional information is retrieved from a look-up table, in response to the source ID of the selected master read queue. After read control logic 102 transfers the constructed outgoing packet header, processing proceeds to MREAD_PKT_DATA state 404.

Within MREAD_PKT_DATA state 404, read control logic 102 reads packet data from the selected master read queue, and transfers this packet data out of serial buffer 100 to the port associated with the selected master read queue. Processing then proceeds to Step 405.

If the data value (e.g., double-word) previously read from the selected master read queue during MREAD_PKT_DATA state 404 is not the last data value of the packet data (Step 405, NO branch), then processing returns to MREAD_PKT_DATA state 404, wherein the next data value of the packet data is read from the selected master read queue. However, if the data value read from the selected master read queue represents the last data value of the packet data (Step 405, YES branch), then processing then processing proceeds to DEC_WLEVEL state 406. The last data value of the packet data can be specified, for example, by an end-of-packet symbol (EOP).

Within DEC_WLEVEL state 406, if the selected master read queue is configured to operate in the non-flush mode, then the water level of the selected master read queue is decremented by one, to reflect the fact that a packet has been read out of this selected queue. Processing then returns to IDLE state 401.

However, if the selected master read queue is configured to operate in the flush mode, then the latched water level previously stored during LATCH_WLEVEL state 402 is decremented by one, and processing proceeds from DEC_WLEVEL state 406 to Step 407. If the latched water mark has not yet reached a zero value (Step 407, NO branch), thereby indicating that not all of the packets below the water mark have been flushed (read) from the selected master read queue, then processing returns to MREAD_PKT_HEADER state 403, such that the next packet is transferred from the selected master read queue in the manner described above.

When the latched water level value reaches zero (Step 407, YES branch), thereby indicating that all of the packets below the water mark have been flushed (read) out of the selected master read queue, then processing returns to IDLE state 401.

Returning now to IDLE state 401, if read control logic 102 initially determines that the selected master read queue is configured to operate in the raw data mode, then processing proceeds from IDLE state 401 to LATCH_RAW_WLEVEL state 411. That is, read control logic 102 will perform the master read operation in a raw data mode. In LATCH_RAW_WLEVEL state 411, read control logic 102 latches the water level of the selected master read queue, which represents the number of packet data values (e.g., double-words) to be read out of this selected queue. Note that in the described embodiment, a selected master read queue configured to operate in the raw data mode is also configured to operate in the flush mode. Processing then proceeds to MREAD_RAW_HEADER state 412.

Within MREAD_RAW_HEADER state 412, read control logic 102 constructs an outgoing packet header in response to the identity of the selected master read queue. The constructed outgoing packet header will include, for example, the source ID of the selected master read queue, which is retrieved from the corresponding queue configuration register. The constructed outgoing packet header will also include the water level latched during LATCH_RAW_WLEVEL state 411 (wherein this latched water level specifies the size of the data being transferred by the master read operation). The constructed outgoing packet header will also include additional information, such as sRIO packet priority level (PRIO_n[1:0]), a TT value (TT_n), a frame type value (FTYPE_n[3:0]), a transaction type value (TTYPE_n[3:0]) and a destination identification (ID) value (DEST_ID_n[3:0]). In one embodiment, this additional information is retrieved from a look-up table, in response to the source ID of the selected master read queue. The constructed outgoing packet header is transferred out of serial buffer 100, to the port associated with the selected master read queue. Processing then proceeds to MREAD_RAW_DATA state 413.

Within MREAD_RAW_DATA state 413, read control logic 102 reads a packet data value (e.g., double-word) from the selected master read queue, and transfers this data value out of serial buffer 100 to the port associated with the selected master read queue. Also within MREAD_RAW_DATA state 413, the double-word count (i.e., the water level) previously latched during LATCH_RAW_WLEVEL state 411 is decremented by one, to reflect the fact that a double-word has been read out of the selected master read queue. Processing then proceeds to Step 414.

If the latched double-word count has not yet reached a zero value, (Step 414, NO branch), then processing returns to MREAD_RAW_DATA state 413, wherein the next double-word is read from the selected master read queue, and the latched water level (i.e., double-word count) is again decremented by one. When the latched double-word count is decremented to a zero value, (Step 414, YES branch), thereby indicating that all of the double-words below the latched water level have been flushed (read) out of the selected master read queue, then processing returns to IDLE state 401.

In the above-describe manner, read control logic 102 may operate as a bus master to transfer data out of queues Q0-Q7 in a packet mode or a raw data mode. If a queue is configured to operate in the packet mode, then the number of packets read out of this queue during a master read operation may be selected by adjusting the water mark associated with this queue (assuming that this queue is also configured to operate in the flush mode). Similarly, if a queue is configured to operate in the raw data mode, then the number of data values read out of this queue during a master read operation may be selected by adjusting the water mark associated with this queue. By selecting the water mark values, the amount of data read from a queue in response to a master read operation may be different than the amount of data previously written to the queue during a write operation. In accordance with one embodiment, the water mark may be selected such that the amount of data read by a master read operation is greater than a maximum packet size (e.g., greater than 256 bytes).

Moreover, during a master read operation read control logic 102 advantageously constructs packet headers for packet data that was previously stored without packet headers in the raw data mode. Because these packet headers are constructed in response to the identity of the selected master read queue, the processing requirements of serial buffer 100 are greatly reduced (as the serial buffer 100 does not require additional software to generate packet headers for packet data stored in the raw data mode).

Although the present invention has been described in connection with various embodiments, it is understood that variations of these embodiments would be obvious to one of ordinary skill in the art. For example, although some values have been described as being stored in the queue configuration registers QCR0-QCR7, it is understood that these values may be represented as flags within serial buffer 100. Thus, the present invention is limited only by the following claims.

We claim:

1. A serial buffer comprising:
   one or more queues;
   one or more queue configuration registers, each associated with a corresponding one of the one or more queues,
   wherein each of the one or more queue configuration registers stores an access mode value that indicates whether the corresponding one of the one or more queues operates in a packet mode or a raw data mode,
   wherein each of the one or more queues may operate in the packet mode and the raw data mode in response to the access mode value, and
   wherein both a packet header and corresponding packet data are written to a queue identified in the packet header if the access mode value of the identified queue indicates that the identified queue operates in the packet mode, and only the corresponding packet data are written to the queue identified in the packet header if the access mode value of the identified queue indicates that the identified queue operates in the raw data mode.

2. The serial buffer of claim 1, further comprising:
   a first port that operates in accordance with a first serial protocol; and
   a second port that operates in accordance with a second serial protocol, different than the first serial protocol, wherein the first port and the second port are coupled to the one or more queues.

3. The serial buffer of claim 1, wherein each of the one or more queue configuration registers stores a read mode value that indicates whether the corresponding one of the one or more queues operates in a flush mode or a non-flush mode, wherein each of the one or more queues may operate in either the flush mode or the non-flush mode in response to the read mode value, and wherein all packet data below a water mark of the queue is read from each of the one or more queues that operate in the flush mode, and wherein packet data associated with a single packet is read from each of the one or more queues that operate in the non-flush mode.

4. The serial buffer of claim 1, wherein each of the one or more configuration registers stores a priority value that indicates a priority with which the corresponding one of the one or more queues is accessed.

5. The serial buffer of claim 1, wherein each of the one or more configuration registers stores a destination address used to access the corresponding one of the one or more queues during a write operation.

6. The serial buffer of claim 5, wherein each of the one or more configuration registers further stores a source address used to access the corresponding one of the one or more queues during a read operation.

7. A method of operating a serial buffer comprising:
receiving an incoming packet that includes a packet header and packet data, wherein the packet header identifies a queue from among one or more queues of the serial buffer;
for each queue of the one or more queues, storing an access mode value that indicates whether the respective queue operates in a packet mode or a raw data mode, wherein the respective queue may operate in either the packet mode or the raw data mode depending on the access mode value;
writing the packet header and the packet data of the incoming packet to the identified queue if the corresponding access mode value indicates that the identified queue operates in the packet mode; and
writing the packet data, but not the packet header, to the identified queue if the corresponding access mode value indicates that the identified queue operates in the raw data mode.

8. The method of claim 7, further comprising writing start-of-packet and end-of-packet delimiters to the identified queue if the corresponding access mode value indicates that the identified queue operates in the raw data mode.

9. The method of claim 7, further comprising:
for each queue of the one or more queues, storing a read mode identification value that indicates whether the respective queue operates in a flush mode or a non-flush mode, wherein the respective queue may operate in either the flush mode or the non-flush data mode depending on the read mode identification value;
determining when a water level of a particular queue reaches a water mark assigned to the particular queue; and
if the corresponding access mode value indicates that the particular queue operates in the packet mode and the corresponding read mode identification value indicates that the particular queue operates in the flush mode, then reading all packet headers and packet data below the water mark assigned to the particular queue upon determining that the water level of the particular queue has reached the water mark assigned to the particular queue.

10. The method of claim 9, further comprising:
if the corresponding access mode value indicates that the particular queue operates in the raw data mode and the corresponding read mode identification value indicates that the particular queue operates in the flush mode, then reading all packet data below the watermark assigned to the particular queue upon determining that the water level of the particular queue has reached the water mark assigned to the particular queue.

11. The method of claim 9, further comprising:
if the corresponding access mode value indicates that the particular queue operates in the packet data mode and the corresponding read mode identification value indicates that the particular queue operates in the non-flush mode, then reading the packet header and packet data of one packet from the particular queue upon determining that the water level of the particular queue has reached the water mark assigned to the particular queue.

12. The method of claim 7, further comprising:
receiving a slave read request packet from a processor, wherein the slave read request packet identifies a queue from among the one or more queues and includes a data size field that specifies an amount of data to be read from the queue identified by the slave read request packet;
accessing the corresponding access mode value to determine whether the queue identified by the slave read request packet operates in the packet mode or the raw data mode; and
transferring data from the queue identified by the slave read request packet to the processor in response to the slave read request packet,
wherein the data size field specifies a number of packets transferred from the queue identified by the slave read request packet to the processor when the queue identified by the slave read request packet operates in the packet mode, and
wherein the data size field specifies a number of data words transferred from the queue identified by the slave read request packet to the processor when the queue identified by the slave read request packet operates in the raw data mode.

13. The method of claim 7, further comprising:
receiving a slave read request packet from a processor, wherein the slave read request packet identifies a queue from among the one or more queues of the serial buffer;
accessing the corresponding access mode value to determine whether the queue identified by the slave read request packet operates in the packet mode or the raw data mode; and
creating a constructed packet header from information included in the slave read request packet if the queue identified by the slave read request packet operates in the raw data mode.

14. The method of claim 13, further comprising:
retrieving packet data from the queue identified by the slave read request packet; and
transmitting the retrieved packet data and the constructed packet header to the processor if the queue identified by the slave read request packet operates in the raw data mode.

15. A method of operating a serial buffer comprising:
receiving an incoming packet that includes a packet header and packet data;
identifying a queue specified by the packet header of the incoming packet from among one or more queues of the serial buffer, each of the one or more queues having a corresponding queue configuration register;
determining, based on an access mode value stored in the queue configuration register corresponding to the identified queue, whether the identified queue operates in a packet mode or a raw data mode, wherein the identified queue is capable of operating in both the packet mode and the raw data mode in response to the access mode value;
writing both the packet header and the packet data of the incoming packet to the identified queue if the identified queue operates in the packet mode; and
writing only the packet data of the incoming packet to the identified queue if the identified queue operates in the raw data mode.

16. The method of claim 15, further comprising:
receiving a read request packet;
identifying a queue specified by the read request packet from among the one or more queues;
determining whether the queue specified by the read request packet operates in the packet mode or the raw data mode;
reading packet data from the queue specified by the read request packet; and creating a constructed packet header using information included in the read request packet if the queue specified by the read request packet operates in the raw data mode.

17. The method of claim 16, further comprising transmitting the constructed packet header and the packet data read from the queue specified by the read request packet as a response to the read request packet.

\* \* \* \* \*